(12) United States Patent
Furukawa et al.

(10) Patent No.: US 7,554,300 B2
(45) Date of Patent: Jun. 30, 2009

(54) CAR POWER SOURCE APPARATUS

(75) Inventors: Kimihiko Furukawa, Kakogawa (JP); Takeshi Osawa, Takasago (JP)

(73) Assignee: Sanyo Electric Co., Ltd., Osaka (JP)

( * ) Notice: Subject to any disclaimer, the term of this patent is extended or adjusted under 35 U.S.C. 154(b) by 412 days.

(21) Appl. No.: 11/472,305

(22) Filed: Jun. 22, 2006

(65) Prior Publication Data

US 2007/0018780 A1 Jan. 25, 2007

(30) Foreign Application Priority Data

Jul. 6, 2005 (JP) ............................. 2005-198076

(51) Int. Cl.
*H02J 7/04* (2006.01)
*H02J 7/16* (2006.01)
*H02H 5/04* (2006.01)

(52) U.S. Cl. ..................... 320/150; 320/134; 361/103
(58) Field of Classification Search ................. 320/134, 320/136, 150, 154, 152; 361/103, 106
See application file for complete search history.

(56) References Cited

U.S. PATENT DOCUMENTS 5,483,145 A * 1/1996 Shiojima et al. ............ 320/150

2005/0206347 A1 9/2005 Seo et al.
2005/0231169 A1 * 10/2005 Seo et al. ..................... 320/150

FOREIGN PATENT DOCUMENTS

JP 10-270094 10/1998

* cited by examiner

*Primary Examiner*—Akm E Ullah
*Assistant Examiner*—Ramy Ramadan
(74) *Attorney, Agent, or Firm*—Wenderoth, Lind & Ponack, L.L.P.

(57) ABSTRACT

The car power source apparatus is provided with a plurality of batteries, a temperature detection circuit, and an abnormal temperature rise prevention circuit. The temperature detection circuit detects electrical resistance change of a plurality of temperature sensors via a voltage conversion circuit, converts voltage conversion circuit output voltage into a digital signal via an A/D converter, and inputs that signal into a control circuit as a temperature signal. The abnormal temperature rise prevention circuit is provided with comparators to compare output voltage from the voltage conversion circuit of the temperature detection circuit with a reference voltage and output an abnormal temperature signal if battery temperature rises to a specified temperature, and a forced current cut-off circuit connected to the comparators to detect a comparator abnormal temperature signal and cut-off battery current. The control circuit and the abnormal temperature rise prevention circuit monitor battery temperature, and cut-off battery current.

12 Claims, 4 Drawing Sheets

CAR POWER SOURCE APPARATUS

BACKGROUND OF THE INVENTION

1. Field of the Invention

This invention relates to a power source apparatus provided with a driving battery for powering the motor of an electric vehicle, such as a hybrid car or electric automobile, or a power source apparatus for an electrical appliance that drives a load, and in particular, relates to a power source apparatus provided with a temperature detection circuit to detect battery temperature.

2. Description of the Related Art

A driving battery, which supplies power to an electric motor that propels a car, has many rechargeable battery cells connected in series to increase output voltage. This is because the electric motor must have high output to propel a car. In this power source apparatus, battery cell temperature becomes high during high current discharge for rapid car acceleration via the motor, during high current charging near full charge while driving on a long hilly road with regenerative braking, or when outside air temperature becomes abnormally high and battery cell ambient temperature becomes high.

Further, in a car power source apparatus, an extremely large number of battery cells, such as 100 or more, are connected in series to increase output voltage to 200V to 400V, for example. When many individual battery cells are connected in series, and charged and discharged, the same current flows in all the battery cells. However, not all battery cells degrade uniformly. Only a particular single battery cell may degrade. Each battery cell will not degrade in exactly the same fashion due to differences such as manufacturing process variation and external environmental factors like operating temperature. If one battery cell degrades and its actual full charge capacity decreases, it will become over-charged or over-discharged when charged or discharged in the same fashion as all the other battery cells. As a result, temperature of the degraded battery cell will increase and even more degradation will occur.

For example, nickel hydrogen (nickel hydride) batteries are used as battery cells of a driving battery. However, for any rechargeable battery, if temperature increases and electrical characteristics degrade, thermal run-away and rapid battery degradation can result from further temperature increase. To avoid this hazard, the car power source apparatus detects the temperature of each battery cell. If the temperature of any battery cell rises, for example, above 80° C., it is judged as the onset of thermal run-away, and contactors (power relays) connected at the output-side of the driving battery are switched OFF to cut-off current flow and prevent damage due to rising temperature.

To realize this high temperature cut-off, PTC temperature sensors were attached in contact with each battery cell in prior art power source apparatus (refer to Japanese Patent Application Disclosure HEI 10-270094 (1998)). Many PTC devices, which were attached to each battery cell, were connected in series and in-turn connected to the input-side of a temperature detection circuit. When temperature increases above the set temperature of a PTC device, its electrical resistance rapidly increases. Therefore, by detecting the total electrical resistance of many PTC devices connected in series, a temperature greater than the PTC set temperature at any battery cell could be detected. This is because the resistance of the series connected PTC devices will increase when the temperature of a battery cell exceeds the set temperature.

However, a temperature detection circuit that detects the electrical resistance of many series connected PTC devices cannot accurately detect the temperature of an individual battery cell. This is because it is difficult to assemble PTC devices all with uniform temperature characteristics. For example, a circuit to detect the temperature of each battery cell using many PTC devices with 10% error in the set temperature (for rapid resistance increase) cannot accurately detect an over-set temperature condition for all battery cells. Further, for a temperature detection circuit that detects total electrical resistance of a large number of PTC devices in series, the greater the number of PTC devices connected in series, the more difficult accurate detection of battery cell temperature becomes. This is because even if a PTC device has resistance increase, its resistance increase becomes a smaller ratio of the total resistance of many PTC devices.

With the object of resolving these types of prior art problems; the present inventor developed a power source apparatus having the circuit configuration shown in FIG. 1 (Japanese Patent Application 2004-77318). This power source apparatus is provided with batteries 91 that drive a load, and temperature detection circuits 92 that detect the temperature of the batteries 91. The batteries 91 are made up of a plurality of battery cells 93 connected in series or parallel. Temperature detection circuits 92 are provided with a plurality of temperature sensors 94 disposed in thermal contact with battery cells 93 and having electrical resistance that decreases when battery temperature becomes high; series resistors 95 connected at one end to a power supply 99 and at the other end to connection nodes 96 for each temperature sensor 94 and causing connection node 96 voltage to change with temperature sensor 94 resistance; and first diodes 98 connected at the connection node 96 of each temperature sensor 94. The polarity of the first diode 98 is such that it conducts in a direction towards the connection node 96. In this power source apparatus, if the temperature of any battery becomes greater than the set temperature, electrical resistance of the temperature sensor 94 in thermal contact with that battery drops and the voltage of the connection node 96 decreases. Consequently, if the voltage of a connection node 96 drops below a set value, current is cut-off to prevent thermal run-away.

The power source apparatus of FIG. 1 can detect battery temperature with a high degree of accuracy and prevent battery thermal run-away. Further, there is no loss in the temperature detection accuracy for each battery even as the number of temperature sensors is increased. However, this power source apparatus requires a dedicated circuit to prevent battery thermal run-away. As a result, it has the drawback of high cost for circuitry to prevent battery thermal run-away.

The present invention was developed to further resolve this drawback. Thus, it is an important object of the present invention to provide a car power source apparatus that can reliably prevent battery thermal run-away with an extremely simple circuit structure.

The above and further objects and features of the invention will more fully be apparent from the following detailed description with accompanying drawings.

SUMMARY OF THE INVENTION

The car power source apparatus of the present invention has the following structure to realize the previously stated object. The car power source apparatus is provided with a plurality of batteries 1 to power an electric motor 19, a temperature detection circuit 2 to detect the temperature of the batteries 1, and an abnormal temperature rise prevention circuit 3 to prevent battery temperature from rising abnormally. The temperature detection circuit 2 is provided with a plurality of temperature sensors 4 disposed in thermal contact with the batteries 1 to produce a change in electrical resistance with battery temperature, a voltage conversion circuit 5 to convert the resistance change of each temperature sensor 4 into voltage change, an analog-to-digital (A/D) converter 6 to convert output voltage from the voltage conversion circuit 5 into a digital signal, and a control circuit 7 that inputs the temperature signal output from the A/D converter 6. The abnormal temperature rise prevention circuit 3 is provided with comparators 8 to compare output voltage from the voltage conversion circuit 5 of the temperature detection circuit 2 with a reference voltage 21 and output an abnormal temperature signal when battery 1 temperature rises above a specified temperature, and a forced current cut-off circuit 10 connected to the comparators 8 to detect a comparator 8 abnormal output signal and cut-off battery 1 current. The control circuit 7 and forced current cut-off circuit 10 of the power source apparatus monitor battery 1 temperature and cut-off battery 1 current when necessary.

The car power source apparatus described above has the characteristic that thermal run-away can be reliably prevented while the circuit to prevent battery thermal run-away has an extremely simple structure. This is because the power source apparatus of the present invention is provided with a temperature detection circuit to detect battery temperature and an abnormal temperature rise prevention circuit to prevent battery thermal run-away. The temperature detection circuit is provided with a control circuit that inputs temperature signals. A plurality of temperature sensors disposed on the battery can produce electrical resistance changes that are converted to voltage changes via the voltage conversion circuit to produce temperature signals. The abnormal temperature rise prevention circuit is provided with a forced current cut-off circuit that cuts-off battery current when an abnormal temperature signal is detected from a comparator. The comparator compares output voltage from the voltage conversion circuit of the temperature detection circuit with a reference voltage and issues an abnormal temperature signal if battery temperature rises to a specified temperature. The control circuit and the abnormal temperature rise prevention circuit monitor battery temperature and cut-off battery current when necessary. Since the abnormal temperature rise prevention circuit of a power source apparatus with this structure uses existing temperature sensors in the temperature detection circuit 2 to detect abnormal battery temperature and cut-off battery current, a special-purpose circuit to detect battery thermal run-away is not required. While keeping circuit structure simple, battery temperature can be monitored to reliably prevent battery thermal run-away with both the control circuit of the temperature detection circuit and the abnormal temperature rise prevention circuit.

Under ordinary conditions in the car power source apparatus of the present invention, the control circuit 7 of the temperature detection circuit 2 detects battery temperature with the digital signal output from the voltage conversion circuit 5 through the A/D converter 6. When the control circuit 7 is not operating normally and battery temperature rises above the specified temperature, the comparator 8 of the abnormal temperature rise prevention circuit 3 can issue an abnormal temperature signal.

In the car power source apparatus of the present invention, the forced current cut-off circuit 10 can cut-off battery 1 current when an abnormal temperature signal is issued.

The abnormal temperature rise prevention circuit 3 of the car power source apparatus of the present invention can be provided with a comparator 8 to detect abnormal battery 1 temperature, and a short circuit comparator 9 to detect temperature sensor 15 short circuit and issue a short circuit signal when a temperature sensor 15 is short circuited. The comparator 8 and short circuit comparator 9 are connected to the forced current cut-off circuit 10. The forced current cut-off circuit 10 cuts-off battery 1 current when an abnormal temperature signal is input from the comparator 8 and a short circuit signal is not input from the short circuit comparator 9. The forced current cut-off circuit 10 does not cut-off battery 1 current when a short circuit signal is output from the short circuit comparator 9.

The abnormal temperature rise prevention circuit of the car power source apparatus described above is provided with a comparator to detect abnormal battery temperature, and a short circuit comparator to detect temperature sensor short circuit. Since temperature sensors are monitored for short circuits and battery current is controlled not to cut-off when a temperature sensor is short circuited, battery current cut-off during temperature sensor circuit failure is reliably prevented.

A comparator 8 can be a comparator that outputs a HIGH abnormal temperature signal when battery 1 temperature rises to the specified temperature, and the short circuit comparator 9 can be a comparator that outputs a LOW short circuit signal when the temperature sensor circuit 15 is short circuited. Comparator 8 and short circuit comparator 9 outputs are input to the forced current cut-off circuit 10 via an AND logic circuit 23. When the AND logic circuit 23 has a HIGH output, battery 1 current is cut-off.

The temperature sensors 4 can be temperature sensing devices that decrease in electrical resistance as battery temperature increases.

The voltage conversion circuit 5 can be configured with series resistors 12 connected in series with temperature sensors 4, and a power supply 13 to establish a voltage on the series connected temperature sensors 4 and series resistors 12.

In addition, the car power source apparatus of the present invention can be provided with a plurality of temperature detection circuits 2 and comparator 8 and short circuit comparator 9 pairs for each temperature detection circuit 2. When none of the short circuit comparators 9 judges a temperature sensor 4 to be short circuited, battery current can be cut-off when at least one comparator 8 of a plurality corresponding to the temperature detection circuits 2 judges battery temperature to be above the specified temperature.

DETAILED DESCRIPTION OF THE PREFERRED EMBODIMENT

Figure 1:
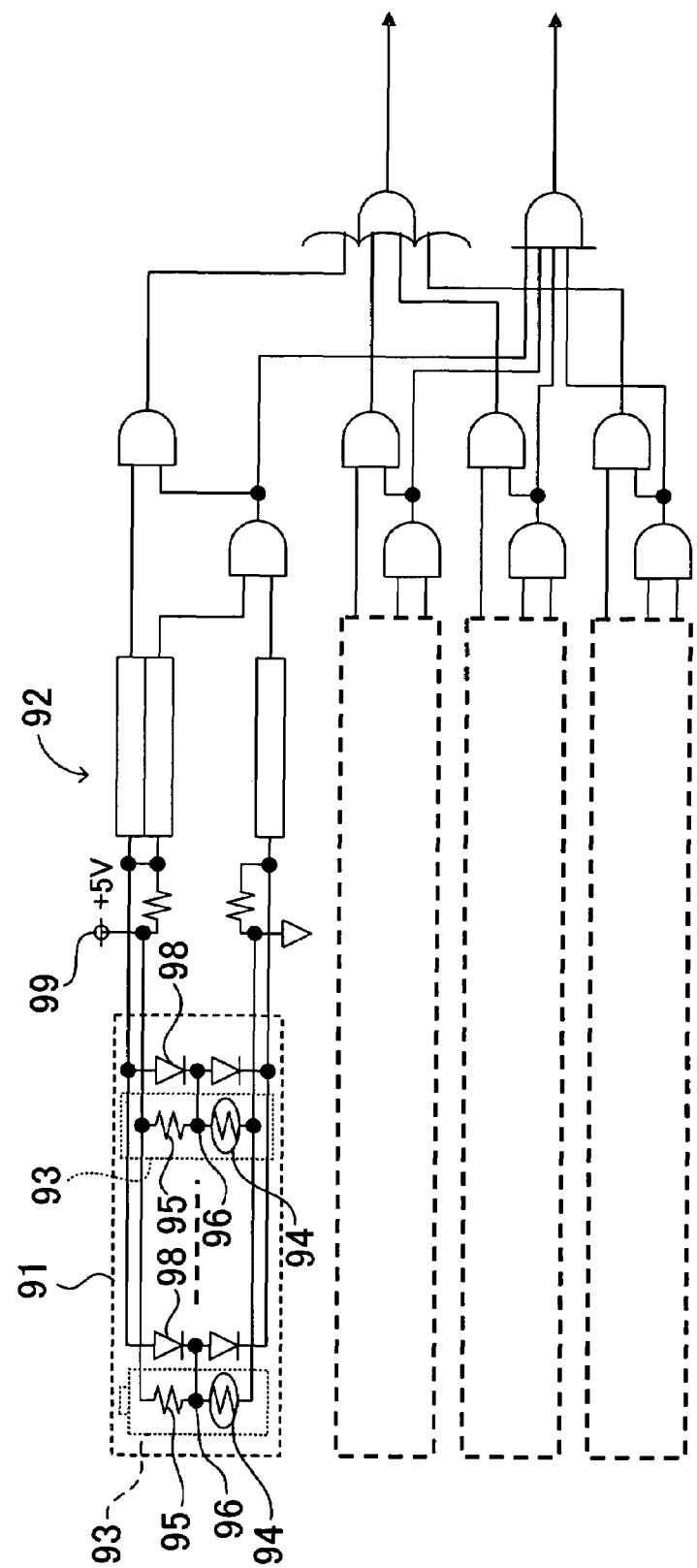
FIG. 1 is a circuit diagram of a power source apparatus of a previous patent application by the present inventor.
Figure 2:
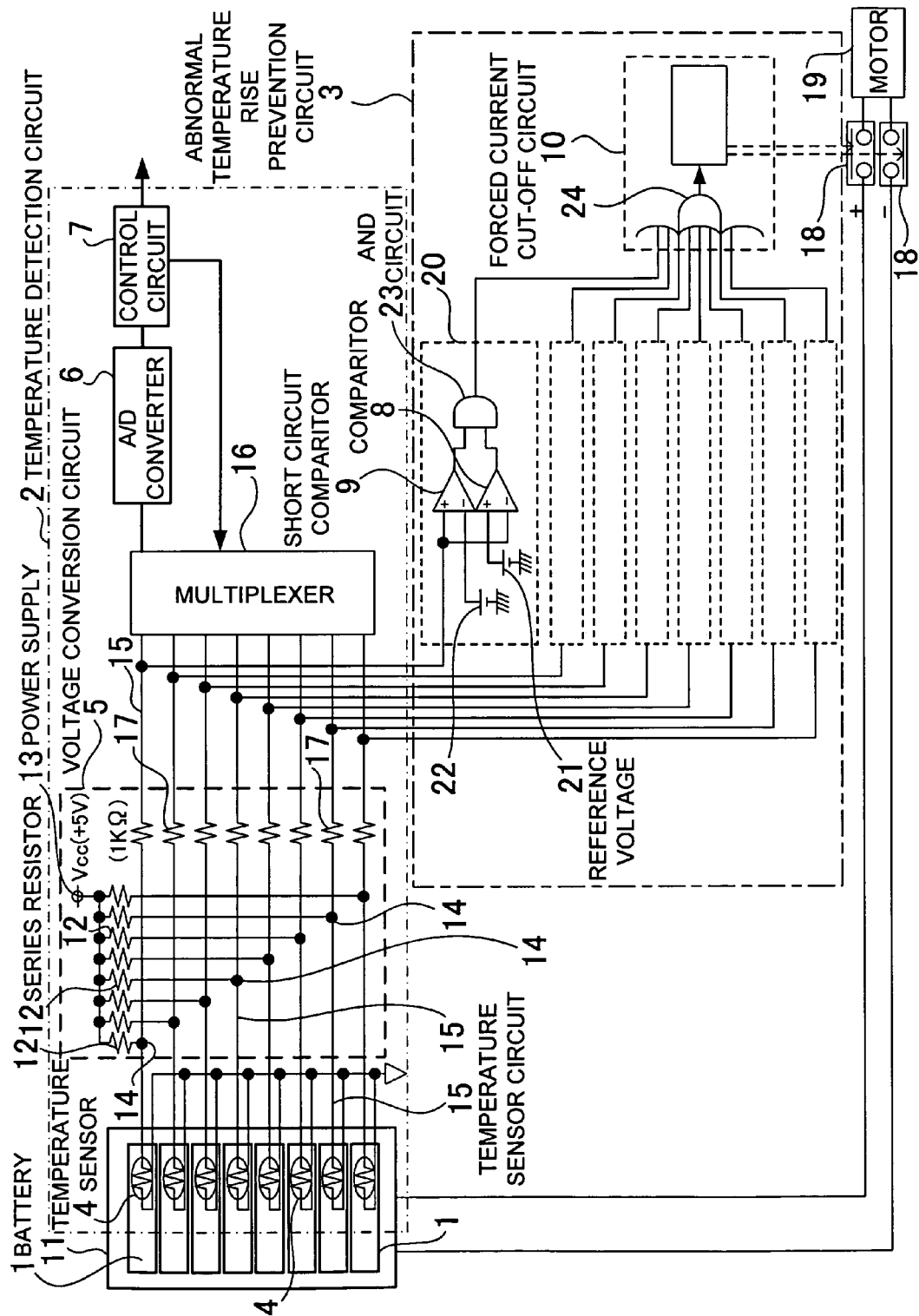
FIG. 2 is a circuit diagram of a car power source apparatus for an embodiment of the present invention.

The power source apparatus shown in FIG. 2 is installed in a hybrid car to supply power to the electric driving motor of the automobile. However, the power source apparatus of the present invention is also used as a power source for a vehicle such as an electric automobile, electric forklift, or indoor mobile load-conveying vehicle. The power source apparatus of FIG. 2 is provided with a driving battery unit 11 to power the motor 19 that drives the car, a temperature detection circuit 2 to detect the temperature of the driving battery unit 11, and an abnormal temperature rise prevention circuit 3 to prevent thermal run-away of the battery unit 11.

The battery unit 11 is provided with a plurality of batteries 1 connected in series or parallel. A battery 1 can be a single battery cell or a battery module made up of a plurality of battery cells connected in series or parallel.

The temperature detection circuit 2 is provided with temperature sensors 4 disposed in thermal contact with the batteries 1 to produce electric resistance change with battery temperature, a voltage conversion circuit 5 to convert the resistance change of each temperature sensor 4 to a voltage change, an A/D converter 6 to convert output voltage from the voltage conversion circuit 5 to a digital signal, and a control circuit 7 to control battery 1 charging and discharging according to the temperature signal output from the A/D converter 6.

A temperature sensor 4 is disposed in thermal contact with each battery 1. A temperature sensor 4 is disposed in direct contact with the surface of each battery 1 or in direct contact with one of a plurality of batteries 1. A temperature sensor 4 may also be disposed in thermal contact with a battery 1 via a superior thermally conducting adhesive such as a silicone-based adhesive. For example, a temperature sensor 4 may be attached to a battery 1 surface with adhesive, or it may be disposed between the battery 1 and thermal shrink-tubing to hold it against the battery 1 surface via the shrink-tubing. Ideally, there is a temperature sensor 4 in thermal contact with every battery 1 to detect the temperature of each battery 1 with a corresponding temperature sensor 4. However, instead of disposing a temperature sensor at the surface of each battery, a single temperature sensor can be disposed between batteries to detect the temperature of two batteries with one temperature sensor. Further, a single temperature sensor can also be put in thermal contact with a plurality of batteries by connection with a thermally conducting plate to detect the temperature of a plurality of batteries with one temperature sensor.

The temperature sensor 4 is a device such as a thermistor that decreases in electrical resistance as the temperature of its thermally connected battery 1 increases. It is possible to manufacture thermistors with extremely small device-to-device variation. Therefore, a power source apparatus with thermistors as temperature sensors can accurately detect temperature with extremely high precision. Devices other than thermistors, which decrease in electrical resistance as temperature increases, can also be used as temperature sensors 4.

The voltage conversion circuit 5 is configured with series resistors 12 connected in series with temperature sensors 4, and a power supply 13 to supply voltage to the series connected temperature sensors 4 and series resistors 12. Each series resistor 12 is connected at one end with a temperature sensor 4 and at the other end with the power supply 13. Since the series resistor 12 is connected in series with the temperature sensor 4, voltage at the intermediate connection node 14 decreases when battery temperature increases and temperature sensor 4 resistance decreases. For example, if the power supply voltage is 5V and electrical resistance of the temperature sensor 4 and series resistor 12 are equal at low battery temperature, voltage at the connection node 14 is 2.5V. If battery temperature increases and temperature sensor 4 resistance decreases, connection node 14 voltage decreases. Consequently, temperature sensor 4 electrical resistance, which indicates battery temperature, can be detected by detecting connection node 14 voltage.

The temperature detection circuit 2 of FIG. 2 has a multiplexer 16 connected at the input side of the A/D converter 6 to time-division multiplex and digitize signals output from each temperature sensor 4. The multiplexer 16 sequentially switches each connection node 14 to connect with the A/D converter 6 and thereby inputs the voltage of each connection node 14 to the A/D converter 6. Since the multiplexer 16 of this temperature detection circuit 2 switches through each connection node 14, the voltage of a plurality of connection nodes 14 can be converted to a digital signal via one A/D converter 6. The multiplexer 16 is controlled by the control circuit 7 to sequentially switch through its inputs. Although not illustrated, the temperature detection circuit can also connect an A/D converter to each connection node and convert voltage at each connection node to a digital signal with each A/D converter.

The control circuit 7 controls battery 1 charging and discharging according to the digital signal input from the A/D converter 6. For example, the control circuit 7 can control maximum charging and discharging battery 1 current in accordance with increasing or decreasing battery 1 temperature. Battery electrical characteristics degrade when a battery at high temperature or low temperature is charged with high current. However, this control can also be curtailed. Further, if battery 1 temperature rises to a set temperature and continued charging or discharging would lead to thermal run-away, the control circuit 7 suspends battery 1 charging or discharging. For example, when the temperature of any battery 1 becomes greater than a set temperature (for example, 80° C.), the control circuit 7 assumes abnormal battery 1 temperature and constrains current (for example, control constrains temperature rise by reducing current) to prevent thermal run-away. If battery 1 temperature continues to rise regardless, contactors 18 connected at the output side of the battery 1 are switched OFF to cut-off current and prevent anticipated battery 1 thermal run-away.

The control circuit 7 operates according to software stored in memory to control battery 1 charging and discharging. As long as the control circuit 7 operates properly, safe battery 1 charging and discharging can be controlled in a normal fashion while preventing battery 1 degradation. However, the software controlled control circuit 7 can malfunction and crash or lock-up. If control circuit 7 operation becomes abnormal, battery 1 charging and discharging will not be properly controlled. When control circuit 7 operation becomes abnormal in this fashion, the abnormal temperature rise prevention circuit 3 described below functions to cut-off battery 1 current.

When the control circuit 7 does not operate properly and battery 1 temperature rises to a specified abnormal temperature, the abnormal temperature rise prevention circuit 3 forcibly cuts-off current to prevent thermal run-away. This specified temperature is set 1-5° C. higher, and preferably, 2-4° C. higher than the abnormal temperature set for the previously described control circuit 7. Setting the specified temperature high allows the control circuit to detect abnormal battery temperature and constrain current (for example, by reducing current to reduce temperature rise) to prevent thermal run-away. This occurs prior to operation of the abnormal temperature rise prevention circuit 3 when the control circuit 7 is functioning normally and battery 1 temperature has become abnormally high and indicative of thermal run-away. If battery 1 temperature rise continues even with control circuit 7 constraints to reduce current as described above, the next current control operation is to switch OFF contactors 18 and cut-off current. When the control circuit 7 is not functioning properly, for example, when the software of the microcomputer in the control circuit 7 fails (including microcomputer crash), instead of control circuit control at the set temperature, the abnormal temperature rise prevention circuit 3, which is implemented in hardware, controls current at the specified temperature by opening the contactors 18 to cut-off current.

The abnormal temperature rise prevention circuit 3 is provided with comparators 8 to compare output voltage from the voltage conversion circuit 5 of the temperature detection circuit 2 with a reference voltage 21 and issue an abnormal temperature signal when battery 1 temperature rises to a specified temperature, and a forced current cut-off circuit 10 connected to the comparators 8 to cut-off battery 1 current if an abnormal temperature signal is detected from a comparator 8. The abnormal temperature rise prevention circuit 3 of FIG. 2 is provided with a plurality of comparison circuits 20 that contain comparators 8.

Since the power source apparatus of FIG. 2 is provided with a plurality of temperature sensors 4, battery charging and discharging is controlled by the temperature detected by each temperature sensor 4. Therefore, the abnormal temperature rise prevention circuit 3 is provided with a plurality of comparison circuits 20 connected to each temperature sensor 4; the apparatus of FIG. 2 is provided with eight comparison circuits 20.

The input side of the comparator 8 of each comparison circuit 20 is connected to an output of the voltage conversion circuit 5. Specifically, the input side of a comparator 8 is connected to a connection node 14 between a temperature sensor 4 and series resistor 12. In the voltage conversion circuit 5 of FIG. 2, input protection resistors 17 (1 KΩ) are connected at the output side of the connection nodes 14, but these input resistors 17 are not always required.

In addition to comparators 8 to detect abnormal battery 1 temperature, the abnormal temperature rise prevention circuit 3 of FIG. 2 is also provided with short circuit comparators 9 to detect short circuit in a temperature sensor circuit 15 and output a short circuit signal when a temperature sensor circuit 15 is short circuited. In the abnormal temperature rise prevention circuit 3 of FIG. 2, each comparison circuit 20 is provided with a comparator 8 and a short circuit comparator 9.

The inverting input terminal of a comparator 8 is connected to a connection node 14, and the non-inverting input terminal is connected to a first reference voltage 21. When the temperature of a battery 1 rises to a specified temperature, the resistance of the temperature sensor 4 drops, the connection node 14 voltage becomes lower than the first reference voltage 21, and comparator 8 output switches from LOW to HIGH. The first reference voltage 21 determines the temperature at which comparator 8 output switches to HIGH; namely, the reference voltage 21 determines the critical temperature of the battery 1. If the first reference voltage 21 is lowered, the specified value of the critical temperature at which the comparator 8 outputs an abnormal temperature signal increases. This is because battery 1 critical temperature must become higher, temperature sensor 4 resistance must become lower, and connection node 14 voltage must become lower before an abnormal temperature signal is output. Consequently, the critical temperature for cutting-off battery 1 charging and discharging current can be set to an optimum value by the first reference voltage 21. Comparator 8 output is LOW when battery 1 temperature is below the critical temperature. When battery 1 temperature becomes higher than the critical temperature, comparator 8 output becomes HIGH. Therefore, a comparator 8 outputs a HIGH level as the abnormal temperature signal.

The first reference voltage 21 is set to a voltage at which the comparator 8 outputs an abnormal temperature signal when battery temperature reaches an abnormal specified temperature, which is a maximum temperature (for example, 80° C.). The first reference voltage 21 is set for the comparator 8 to output an abnormal temperature signal when battery temperature becomes higher than the temperature at which the software operated control circuit 7 cuts-off battery 1 current. For example, the first reference voltage 21 is set to a voltage where the comparator 8 outputs an abnormal temperature signal 1-5° C. higher, and preferably, 2-4° C. higher than the battery temperature for control circuit 7 current cut-off.

In case of a short circuit in elements such as temperature sensors 4, or in case of an open circuit in the temperature sensor circuit 15, the control circuit 7 detects abnormal voltage at a connection node 14. In the abnormal temperature rise prevention circuit 3, short circuit comparators 9 check that there are no short circuits in the temperature sensor circuit 15. Specifically, when the previously described comparator 8 detects abnormality, the short circuit comparator 9 checks that there is no short circuit and a valid connection node 14 voltage is being measured. The non-inverting (plus) input terminal of a short circuit comparator 9 is connected to a connection node 14, and the inverting (minus) input terminal is connected to a second reference voltage 22. The second reference voltage 22 is set to a lower voltage than the first reference voltage 21. This is because voltage at a connection node 14 is lower for a short circuit in the temperature sensor circuit 15 than when battery temperature rises to the specified temperature. The short circuit comparator 9 of FIG. 2 switches from HIGH to LOW when a short circuit is detected in the temperature sensor circuit 15. Therefore, a short circuit signal is a LOW output from the short circuit comparator 9.

Output from the comparator 8 and short circuit comparator 9 is input to the forced current cut-off circuit 10 via an AND logic circuit 23. The AND circuit 23 outputs a HIGH level, which is input to the forced current cut-off circuit 10, when both the comparator 8 and short circuit comparator 9 output HIGH levels. When a HIGH level is input to the forced current cut-off circuit 10, it cuts-off battery 1 current. The comparator 8 outputs a HIGH level as its abnormal temperature signal, and the short circuit comparator 9 outputs a LOW level as its short circuit signal. Therefore, the AND circuit 23 outputs a HIGH level to cut-off battery 1 current only when the comparator 8 outputs an abnormal temperature signal and, in addition, the short circuit comparator 9 does not output a short circuit signal, but rather outputs a HIGH level. If the short circuit comparator 9 outputs a LOW short circuit signal, AND circuit 23 output will be LOW even if the comparator 8 outputs a HIGH abnormal temperature signal. Consequently, when the short circuit comparator 9 outputs a short circuit signal, the forced current cut-off circuit 10 does not cut-off battery 1 current even though the comparator 8 may output a HIGH abnormal temperature signal.

The power source apparatus of FIG. 2 monitors the temperature sensor circuit 15 for short circuits, and the abnormal temperature rise prevention circuit 3 is controlled to ignore battery 1 current cut-off when a short circuit is detected in the temperature sensor circuit 15. However, when an open circuit or short circuit occurs in an element such as a temperature sensor 4, the control circuit 7 detects abnormal voltage at a connection node 14. The power source apparatus of the present invention does not necessarily require short circuit comparators, and the forced current cut-off circuit can also be controlled by comparator output alone.

The forced current cut-off circuit 10 is provided with an OR logic circuit 24. Output from each comparison circuit 20 is connected to the input side of the OR circuit 24. Output from each comparison circuit 20 is input to the OR circuit 24 via the AND circuits 23. If a HIGH abnormal temperature signal is input to the OR circuit 24 from any of the comparison circuits 20, the forced current cut-off circuit 10 switches the contactors 18 connected between the battery unit 11 and its load, which is the electric motor 19, OFF to cut-off battery 1 current.

Figure 3:
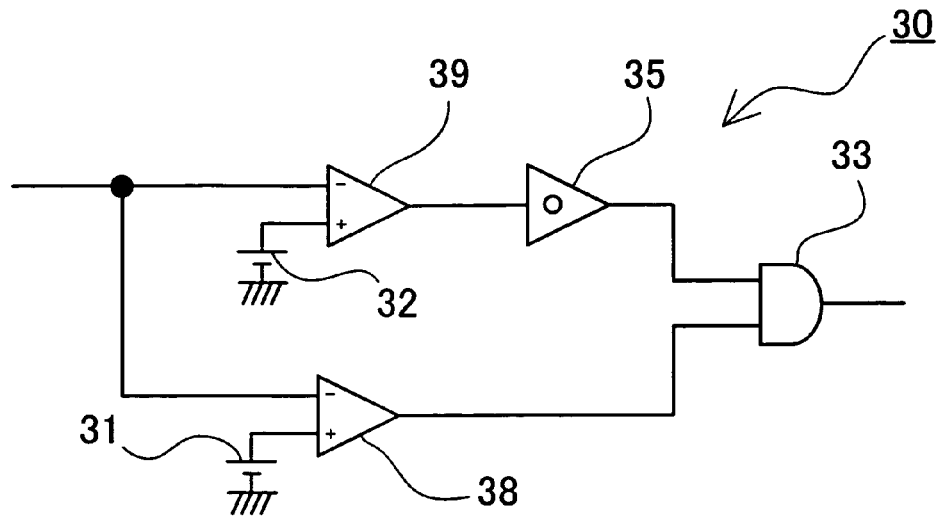
FIG. 3 is a circuit diagram showing another example of an abnormal temperature rise prevention circuit.

The power source apparatus of the present invention does not limit the abnormal temperature rise prevention circuit to the circuit configuration of FIG. 2. For example, as shown in FIG. 3, the first reference voltage 31 can be input to the non-inverting (plus) side of the comparator 38, and the second reference voltage 32 can be input to the non-inverting (plus) side of the short circuit comparator 39. An inverter circuit 35 is connected at the output side of the short circuit comparator 39 of the abnormal temperature rise prevention circuit 30 of FIG. 3, and an inverted level is input to the AND circuit 33.

Figure 4:
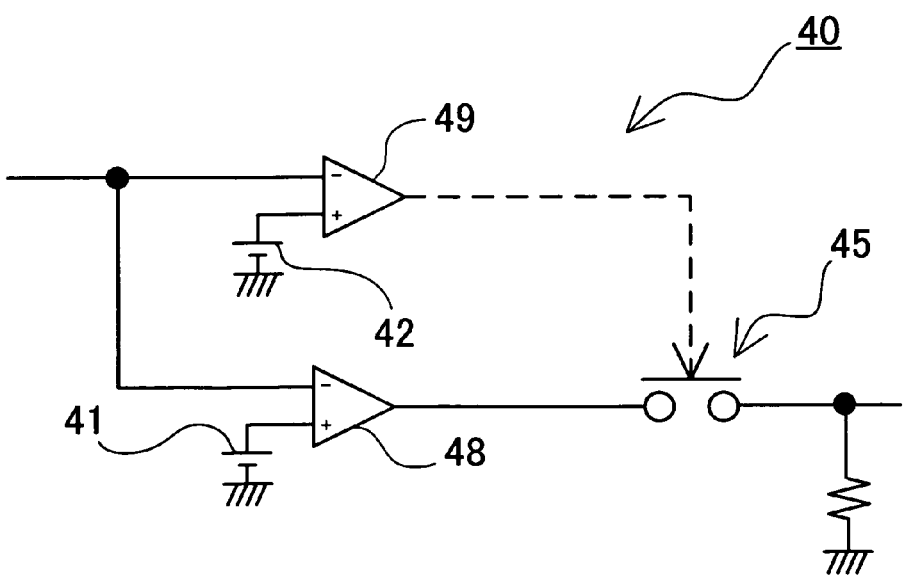
FIG. 4 is a circuit diagram showing another example of an abnormal temperature rise prevention circuit.

In the abnormal temperature rise prevention circuit 40 of FIG. 4, a switch 45 is connected at the output side of the comparator 48, and that switch 45 is switched OFF if a short circuit in the temperature sensor circuit is detected. In this abnormal temperature rise prevention circuit 40, if the short circuit comparator 49 detects a short circuit in the temperature sensor circuit and outputs a short circuit signal, the switch 45 is turned OFF by that short circuit signal. Consequently, if there is a short circuit in the temperature sensor circuit, the forced current cut-off circuit will not cut-off battery current even if the comparator 48 outputs a HIGH abnormal temperature signal.

Figure 5:
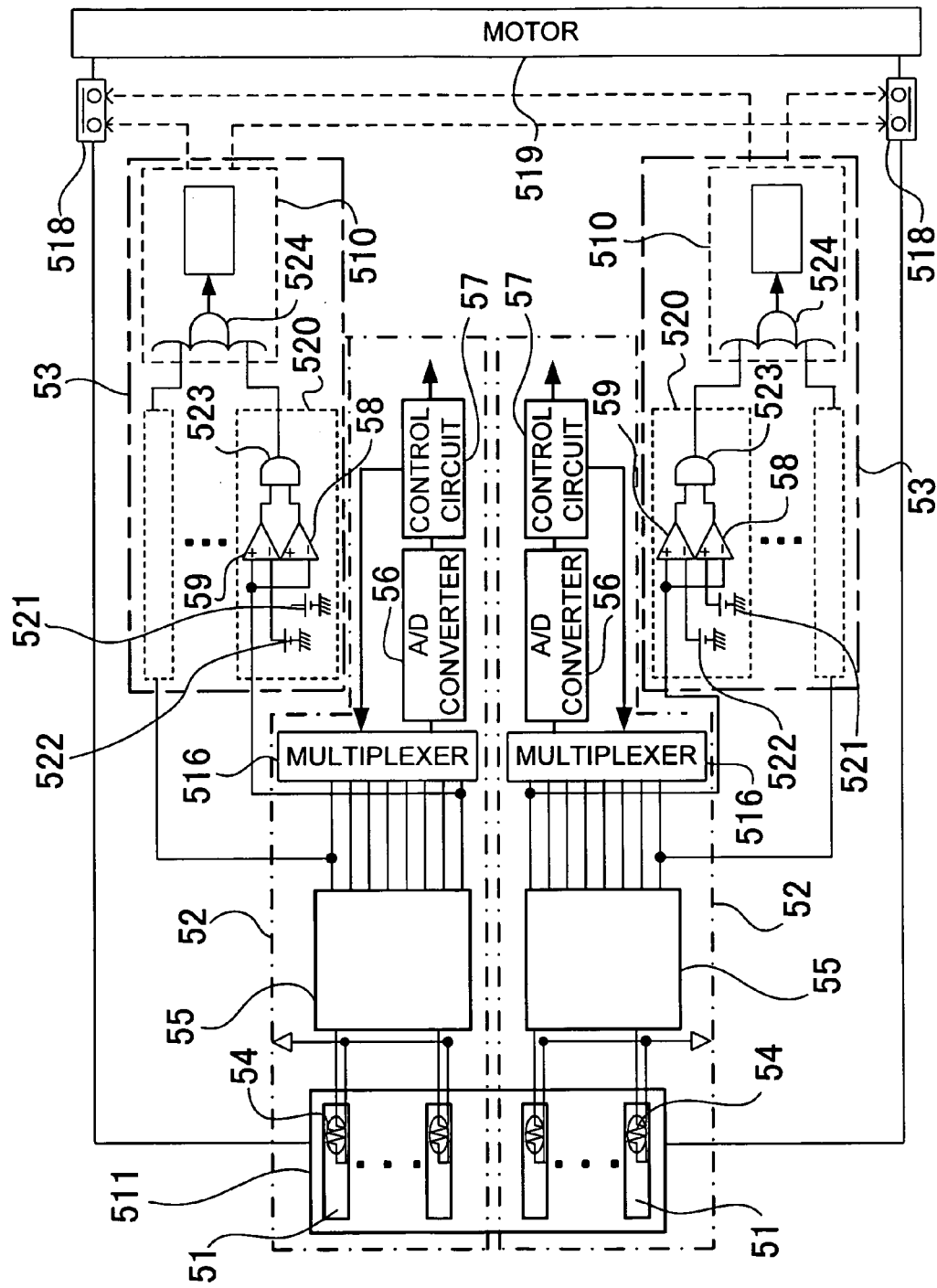
FIG. 5 is a circuit diagram of a car power source apparatus for another embodiment of the present invention.

Further, as shown in the car power source apparatus of FIG. 5, a plurality of temperature detection circuits 52 can be provided to monitor the plurality of batteries 51 of the battery unit 511 by dividing them into a plurality of battery blocks. In this embodiment, structural elements, which are the same as those in the previously described power source apparatus shown in FIG. 2, have the same numeric label except the left-most digit has been changed, and their description is abbreviated.

In the power source apparatus shown in FIG. 5, the battery unit 511 is divided into two blocks and a temperature detection circuit 52 is provided for each block. In each temperature detection circuit 52, electrical resistance change of temperature sensors 54 disposed in thermal contact with the batteries 51 is converted to voltage change by the voltage conversion circuit 55, output voltage from the voltage conversion circuit 55 is converted to a digital signal by the A/D converter 56, and that digital signal is input to the control circuit 57. Further, the voltage conversion circuit 55 of each temperature detection circuit 52 is connected to a respective abnormal temperature rise prevention circuit 53. In each abnormal temperature rise prevention circuit 53, voltage conversion circuit 55 output is input to pairs of comparators 58 and short circuit comparators 59. Comparators 58 and short circuit comparators 59 are connected to a forced current cut-off circuit 510. When a short circuit signal is not output from a short circuit comparator 59 and an abnormal temperature signal is output from a comparator 58, the forced current cut-off circuit 510 cuts-off battery 51 current. In this power source apparatus, when at least one comparator 58 of a plurality of comparators 58 detects temperature above the specified temperature, battery current is cut-off. In this power source apparatus, batteries 51 are monitored by both the control circuits 57 of a plurality of temperature detection circuits 52 and by a plurality of abnormal temperature rise prevention circuits 53, and if abnormal temperature is detected by any of those circuits, battery 51 current is cut-off. In FIG. 5, 516 are multiplexers, 518 are contactors, 519 is an electric motor, 520 are comparison circuits, 521 is a reference voltage, 522 is another reference voltage, and 524 are OR circuits.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims. The present application is based on Application No. 2005-198076 filed in Japan on Jul. 6, 2005, the content of which is incorporated herein by reference.

What is claimed is:

1. A car power source apparatus comprising:
   a plurality of batteries to power an electric motor, at least one temperature detection circuit to detect the temperature of the plurality of batteries, an abnormal temperature rise prevention circuit to prevent battery temperature from rising abnormally, wherein
   said at least one temperature detection circuit is provided with a plurality of temperature sensors disposed in thermal contact with the plurality of batteries to produce a change in electrical resistance with battery temperature, a voltage conversion circuit to convert the electrical resistance change of each temperature sensor into a voltage change, an analog-to-digital (A/D) converter to convert output voltage from the voltage conversion circuit into a digital signal, and a control circuit that inputs the temperature signal output from the A/D converter;
   said abnormal temperature rise prevention circuit is provided with comparators to compare output voltage from the voltage conversion circuit of said at least one temperature detection circuit with a reference voltage and output an abnormal temperature signal when battery temperature rises above a specified temperature, and a forced current cut-off circuit connected to the comparators to detect a comparator abnormal temperature signal and cut-off battery current; and
   the control circuit and said abnormal temperature rise prevention circuit monitor battery temperature, and control battery current, and
   the control circuit constrains battery current when battery temperature rises to the specified temperature set by the control circuit, and said abnormal temperature rise prevention circuit controls to cut-off battery current when battery temperature rises to the specified temperature set by said abnormal temperature rise prevention circuit, the specified temperature for battery current cut-off set by said abnormal temperature rise prevention circuit being higher than the specified temperature for battery current cut-off set by the control circuit.

2. A car power source apparatus as recited in claim 1 wherein under normal conditions, the control circuit of said at least one temperature detection circuit detects battery temperature with the digital signal output from the voltage conversion circuit via the A/D converter; and
   when the control circuit is not operating normally and battery temperature rises above the specified temperature, a comparator of said abnormal temperature rise prevention circuit issues an abnormal temperature signal.

3. A car power source apparatus as recited in claim 1 wherein the forced current cut-off circuit cuts-off battery current if an abnormal temperature signal is output.

4. A car power source apparatus as recited in claim 1 wherein said abnormal temperature rise prevention circuit is provided with a first comparator to detect abnormal battery temperature, and a short circuit comparator to detect a short circuit in the temperature sensor circuit and issue a short circuit signal if the temperature sensor circuit is short circuited; the first comparator and short circuit comparator are connected to the forced current cut-off circuit;

the forced current cut-off circuit cuts-off battery current if an abnormal temperature signal is input from the first comparator and a short circuit signal is not input from the short circuit comparator; and the forced current cut-off circuit does not cut-off battery current when a short circuit signal is output from the short circuit comparator.

5. A car power source apparatus as recited in claim 4 wherein the first comparator outputs a HIGH abnormal temperature signal when battery temperature becomes greater than or equal to the specified temperature, and the short circuit comparator is a comparator that outputs a LOW short circuit signal when the temperature sensor circuit is short circuited; the first comparator and short circuit comparator outputs are input to the forced current cut-off circuit via an AND circuit; and battery current is cut-off when the AND circuit outputs a HIGH level to the forced current cut-off circuit.

6. A car power source apparatus as recited in claim 1 wherein the plurality of temperature sensors are temperature sensing devices that decrease in electrical resistance as battery temperature increases.

7. A car power source apparatus as recited in claim 1 wherein the voltage conversion circuit has series resistors connected in series with the plurality of temperature sensors, and a power supply to supply voltage to the series connected plurality of temperature sensors and series resistors.

8. A car power source apparatus as recited in claim 1 wherein a plurality of temperature detection circuits are provided, and first comparator and a short circuit comparator pairs are provided for each of the plurality of temperature detection circuit; and while no short circuit signals are issued from the short circuit comparators, battery current is cut-off when at least one first comparator of a plurality corresponding to the plurality of temperature detection circuits judges battery temperature to be above the specified temperature.

9. A car power source apparatus as recited in claim 1 wherein a multiplexer is connected at the input side of the A/D converter to time-division multiplex and digitize signals output from the plurality of temperature sensors.

10. A car power source apparatus as recited in claim 1 wherein the control circuit limits maximum charging and discharging battery current to lower values as battery temperature increases, and the control circuit suspends charging and discharging if battery temperature rises to a set temperature.

11. A car power source apparatus as recited in claim 1 wherein the control circuit limits maximum charging and discharging battery current to lower values as battery temperature decreases.

12. A car power source apparatus as recited in claim 1 wherein the specified temperature for battery current cut-off by said abnormal temperature rise prevention circuit is set 1° C. to 5° C. higher than the set temperature for battery current cut-off by the control circuit.

* * * * *